Patented Dec. 5, 1950

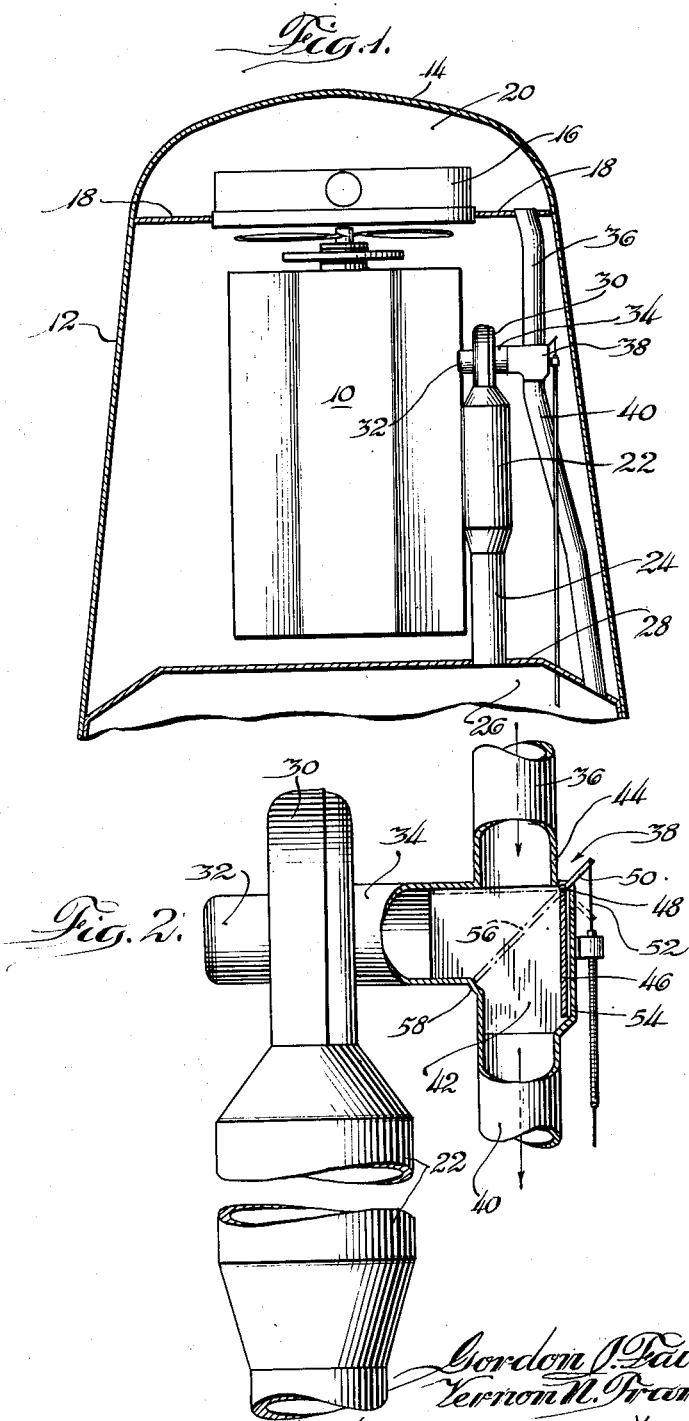

2,532,486

UNITED STATES PATENT OFFICE 2,532,486

HEATING AND VENTILATING SYSTEM

Gordon J. Fairbanks and Vernon N. Tramontini, Indianapolis, Ind., assignors to Stewart-Warner Corporation, Chicago, Ill., a corporation of Virginia Application May 9, 1947, Serial No. 746,980

2 Claims. (Cl. 98—2)

The present invention relates to a heating and ventilating system that is particularly adapted for the heating and ventilating of automobiles or like vehicles.

One of the objects of the present invention is to provide a novel heating and ventilating system for use in an automobile or like vehicle which provides optionally for shutting off ventilating air, a flow of atmospheric temperature ventilating air from the outside to the passenger compartment, a flow of heated air from the outside to the passenger compartment, or a flow of recirculated heated air which is continuously taken from the passenger compartment, heated and then returned to the passenger compartment.

Yet another object of the present invention is to provide a novel heating and ventilating system including an automobile heater which provides at low cost an arrangement such that the operator by the remote operation of simple controls can cause the heater to function as a fresh air heater, a recirculating heater, or, if desired, may supply ventilating air to the passenger compartment without heat, or may shut off all flow of ventilating air.

Still another object of the present invention is to provide a system for heating and ventilating an automobile wherein a combustion heater is used such that it is impossible to interrupt the flow of ventilating air to the heater and at the same time which may be operated to prevent the flow of cold air into the passenger compartment while the heater is warming up.

Other objects and advantages will become apparent from the following description of a preferred embodiment of our invention which is illustrated in the accompanying drawings.

In the drawings:

Fig. 1 is a somewhat diagrammatic plan view of the front portion of an automobile, portions of the engine hood and dash being illustrated in horizontal section; and Fig. 2 is a detail view of a portion of Fig. 1 with parts thereof broken away so as better to disclose the internal arrangement.

A heating and ventilating system for an automobile preferably should optionally provide the following features. It should provide for a flow of ventilating air at atmospheric temperature from some uncontaminated point outside the vehicle to the passenger compartment so as to provide for a continuous change of air. The system should also provide for heating the passenger compartment of the vehicle and under most conditions this heated air should be taken from outside the vehicle so as to give a continuous change of air within the passenger compartment. This is partially because if outside air is heated and then delivered to the passenger compartment the humidity within the passenger compartment will be at a lower level than if a recirculation type heater is used. Thus, heated fresh air has an advantage over heated recirculated air in that it prevents fogging of the glass surfaces of the vehicle. On the other hand, it takes a heater a period of three quarters of a minute or more to come up to operating temperature after being started. Therefore, if outside ventilating air is permitted to flow through the heater during the warm-up interval, cold air will be blown into the passenger compartment and this obviously is undesirable from the standpoint of the occupants' comfort.

It will be appreciated, however, that if a system of dampers is used to shut off the flow of ventilating air to the heater during the warm-up period some interlocking system should be provided to insure that the dampers will be opened as soon as the heater gets hot as otherwise the heater will quickly overheat. This last objection is overcome if a recirculating system is used, but as pointed out previously, recirculating systems have the disadvantage of not providing fresh ventilating air and of permitting the humidity within the passenger compartment to rise to an unsatisfactory level.

The heating and ventilating system of the present invention is intended to use a combustion heater of the general type disclosed in the copending applications of George W. Allen and Vernon N. Tramontini, Serial No. 676,776, filed June 14, 1946, now Patent No. 2,507,081; and Vernon N. Tramontini, Serial No. 633,733, filed December 8, 1945, now Patent No. 2,481,630. Of course, other heaters may be used in place of these specific heaters, if desired.

In a heater of this type the engine fuel, usually gasoline, is burned and the hot products of combustion are passed through a heat exchanger and thence to atmosphere. Within the heat exchanger these hot products of combustion are in heat exchange relation to the ventilating air passing through the heater and it will be appreciated that any interruption in the ventilating air flow for a substantial period will cause the heater to overheat. Overheating is, of course, a serious disadvantage even though safety controls are provided for turning off the heater in the event that it becomes too hot, because at best the heater will cycle on and off.

If a heater of this type is used in a heating and ventilating system in an automobile, it is preferable that it be connected so that ventilating air flowing to the heater of the passenger compartment will originate outside the vehicle so as to provide for a periodic change of air and tend to prevent the humidity within the vehicle from rising to an unsatisfactory level. The present heating and ventilating system provides for operation of the heater in this manner and further enables the operator by the movement of a simple control to shift the heater connections in such manner that air is recirculated between the passenger compartment and the heater and all connection is cut off from the outside atmosphere.

These recirculation connections are an advantage in that they permit the heater to raise the passenger compartment temperature to a comfortable level more quickly than can be accomplished if all of the air originates from outside the vehicle and this is particularly an advantage in extremely cold weather. Also, when the recirculation connections are used, cold air will not be forced into the passenger compartment during the warm-up period of the heater and on the other hand it is not necessary for the operator to open a valve at the right moment to prevent the heater from overheating as might be necessary if a valve were used to prevent the flow of ventilating air through the heater during the warm-up period. Further, the system provides for the flow of unheated ventilating air from a point outside the vehicle to the passenger compartment because of the dynamic pressure difference between two different areas of the vehicle when the vehicle is in motion, thus providing for a flow of ventilating air without the consumption of electric power which would be required if blowers alone were used for ventilation.

As will be seen presently, all of the above functions of the heating and ventilating system of the present invention can be accomplished by the operation of a single simple three-position valve.

Referring to the drawings, we have diagrammatically indicated an automobile engine 10 as being enclosed within a hood 12, the front portion of which has an air inlet opening at 14. The automobile engine radiator 16 is located ahead of the engine 10 and its front and back sides are separated by baffles 18, thereby making a fresh air plenum chamber of the space 20 ahead of the radiator 16.

Beneath the hood we have shown a combustion type air heater 22 as being mounted adjacent the engine 10 and being connected on its outlet side to a duct 24 leading to the passenger compartment 26 directly to the rear of the dash 28 which separates the passenger compartment from the engine compartment. Although the duct 24 has been shown as emptying directly into the passenger compartment it will be appreciated that this duct may lead to one or several outlet openings in the passenger compartment for distributing the heated air as desired.

The heater 22 receives ventilating air from a blower 30 driven by an electric motor 32, the blower inlet comprising a fitting 34.

Fresh ventilating air is supplied to the system by a duct 36 which extends from a point ahead of the baffle 18 to a three-position T-shaped valve 38, a side outlet of which is connected to the fitting 34 leading to the blower 30 while another outlet of the valve leads to a duct 40 which extends rearwardly through the dash 28 into the passenger compartment at one side.

By referring to Fig. 2, it will be seen that the three-position valve 38 comprises a housing 42 having an inlet opening 44 connected to the duct 36 which is directly opposite the outlet opening leading to the duct 40. A second or side outlet opening leads from the housing 42 at right angles to the ducts 36 and 40 and is connected to the blower fitting 34. The housing as shown is provided with a damper or valve plate 46 which is pivoted about a vertically disposed pin 48 arranged closely adjacent the edge of the inlet fitting 44 farthest from the blower fitting 34. The damper valve is connected to a lever 50, the free end of which extends outwardly and is attached to a Boden wire control 52 leading to the passenger compartment, where the opposite end is secured to an adjustment lever, not shown, but which may be conventional.

When the Boden wire control is moved so as to pull rearwardly upon the free end of the lever 50, it swings the damper plate 46 into a position across the opening of the inlet fitting 44 so that air cannot pass into the housing 42 through the inlet duct 36. When the valve is in this position, operation of the blower 30 and heater 22 will cause air to flow from the passenger compartment to the valve 38 by way of the duct 40 and thence to the blower 30 by way of the fitting 34 and from the blower through the heater 22 back to the passenger compartment by way of the duct 24. This position of the valve, therefore, may be used whenever it is desired to operate the heater 22 as a recirculation heater and also, if the heater is turned off, whenever it is desired that neither heat nor ventilating air be supplied to the passenger compartment.

When the control is moved so as to push the Boden wire 52 forwardly to the limit of movement of the control, the damper plate 46 will be swung into a position parallel to the ducts 36 and 40 and into a pocket 54 so as to be out of the line of flow of air passing through the valve from duct 36 to duct 40. When the valve is in this position fresh ventilating air is free to flow from a point ahead of the engine radiator to the passenger compartment by way of the duct 40 under the dynamic pressure existing at the front of the automobile. Also, of course, a portion of this air may flow through the heater 22 and duct 24, although because of the higher pressure drop in this direction the major portion of this air flows directly by way of the duct 40. The valve is used in this position for warm weather ventilation.

When the valve is in an intermediate position, shown by the broken lines at 56, its free end is closely adjacent a short curved wall 58 of the housing 42 where the duct 40 joins the branch 34. The damper 46 when in this position therefore prevents fresh ventilating air from flowing through the duct 40 but connects the heater inlet fitting 34 to the inlet duct 36 so that ventilating air can pass from a position ahead of the automobile radiator to the valve 38 and thence to the blower 30 from which it passes through the heater 22 to the passenger compartment. When the valve is in this position the heating system is operated as a fresh air heater so that none of the air is recirculated. From an inspection of the drawings it will be seen that although the valve may be used to direct the air as required, or to shut off the fresh ventilating air, it is not possible for the valve to be placed in a position such that the heater 22 will be starved for ventilating air.

From the above description of a preferred embodiment of our invention it will be apparent that this invention accomplishes all of the objectives set out for it at low cost and by the provision of only one valve which is easily controlled from a remote point.

Having described our invention, what we claim as new and useful and desire to secure by Letters Patent of the United States is:

1. A heating and ventilating system for an automotive vehicle having a passenger space comprising a duct opening forwardly in an uncontaminated region and leading into the passenger space, a valve chamber in said duct dividing said duct into an inlet portion and a ventilating portion, a branch duct leading from said valve chamber, an air heater connected on its inlet side to said branch and on its outlet side to said passenger space, blower means for circulating air through said branch duct and heater, a pivoted valve plate in said chamber, said plate being pivotable to a first position extending across said chamber shutting off flow between said ventilating portion and said chamber and connecting said inlet portion to said branch, said plate being pivotable to a second position extending across said chamber shutting off flow between said inlet and said chamber and connecting said ventilating portion to said branch, said plate being pivotable into a third position in which said inlet portion is connected to said ventilating portion, and means for pivoting said plate.

2. A heating and ventilating system for a vehicle having a passenger space, said system comprising a duct having one end opening forwardly into an uncontaminated region outside said passenger space, a damper housing connected to the other end of said duct, a conduit connected at one end to said housing substantially in axial alignment with said duct, the other end of said conduit connected to said passenger space, a branch duct connected at one end to said housing so as to communicate both with said duct and said conduit, a blower having inlet and outlet connections connected at its inlet to the other end of said branch, an air heater connected at its inlet to said blower outlet and at its outlet to said passenger space, a pivoted damper located in said housing, said damper when pivoted to a first position extending across said housing and closing off said conduit to prevent flow between said conduit and said housing, said damper when pivoted to a second position extending across said housing closing off said duct to prevent flow between said duct and said housing, said damper when in a third position lying substantially parallel to the axis of said duct to permit free flow from said duct to said conduit by way of said housing, and means for pivoting said damper, whereby when said damper is in said first position and said blower is operating all of the air passing through said blower and heater will be drawn in at said forward opening, when said damper is in said second position and said blower is operating all of the air passing through said blower and heater will be drawn from said passenger space by way of said conduit, and when said damper is in said third position air can flow freely under the influence of vehicle movement from said forward opening to said passenger space by way of said duct and said conduit.

GORDON J. FAIRBANKS.
VERNON N. TRAMONTINI.

REFERENCES CITED

The following references are of record in the file of this patent:

UNITED STATES PATENTS

| Number | Name | Date |
|---|---|---|
| 1,975,130 | Stewart | Oct. 2, 1934 |
| 2,189,348 | Mayo | Feb. 6, 1940 |
| 2,325,427 | Reynolds | July 27, 1943 |
| 2,330,725 | McGrath | Sept. 28, 1943 |
| 2,391,408 | Galamb et al. | Dec. 25, 1945 |